(12) United States Patent
Astrike

(10) Patent No.: US 11,691,574 B2
(45) Date of Patent: Jul. 4, 2023

(54) METHOD OF FORMING A HEADLINER THAT INCLUDES SHAPED REINFORCEMENT BRACKETS

(71) Applicant: Toyota Motor Engineering & Manufacturing North America, Inc., Plano, TX (US)

(72) Inventor: Logan R. Astrike, Dexter, MI (US)

(73) Assignee: Toyota Motor Engineering & Manufacturing North America, Inc., Plano, TX (US)

(*) Notice: Subject to any disclaimer, the term of this patent is extended or adjusted under 35 U.S.C. 154(b) by 832 days.

(21) Appl. No.: 16/532,914

(22) Filed: Aug. 6, 2019

(65) Prior Publication Data

US 2021/0039566 A1 Feb. 11, 2021

(51) Int. Cl.
*B60R 13/02* (2006.01)
*B29C 70/04* (2006.01)
*B29C 70/00* (2006.01)
*B29L 31/30* (2006.01)

(52) U.S. Cl.
CPC .......... *B60R 13/0231* (2013.01); *B29C 70/00* (2013.01); *B29C 70/04* (2013.01); *B60R 13/0212* (2013.01); *B29L 2031/3011* (2013.01)

(58) Field of Classification Search
CPC . B60R 13/0231; B60R 13/0212; B29C 70/00; B29C 70/04; B29L 2031/3011
See application file for complete search history.

(56) References Cited

U.S. PATENT DOCUMENTS

| | | | |
|---|---|---|---|
| 6,120,090 A | 9/2000 | Van Ert et al. | |
| 6,295,711 B1* | 10/2001 | Shields | B60R 13/0231 29/415 |
| 7,097,225 B2 | 8/2006 | Huisingh et al. | |
| 9,475,449 B2 | 10/2016 | Thomas et al. | |
| 2003/0193218 A1* | 10/2003 | Ito | B60J 7/003 296/214 |
| 2011/0133522 A1* | 6/2011 | Kring | B60R 13/0225 296/214 |
| 2019/0184895 A1* | 6/2019 | Oshina | B60Q 3/208 |
| 2020/0317035 A1* | 10/2020 | Lewis | B60J 7/1265 |

FOREIGN PATENT DOCUMENTS

| | | |
|---|---|---|
| DE | 102011115935 A1 | 4/2013 |
| IN | 201641013065 A | 9/2017 |
| KR | 20070091477 A | 9/2007 |

* cited by examiner

*Primary Examiner* — Francisco W Tschen
*Assistant Examiner* — Elisa H Vera
(74) *Attorney, Agent, or Firm* — Dinsmore & Shohl LLP

(57) ABSTRACT

A method of forming a headliner for a vehicle includes forming the headliner into a desired shape from one or more materials. The headliner includes a headliner cutout portion corresponding to an opening through the headliner. A reinforcement bracket preform is formed into the headliner cutout portion during the step of forming the headliner. The headliner cutout portion is removed from the headliner. The reinforcement bracket preform is removed from the headliner cutout portion and a shaped reinforcement bracket is formed.

8 Claims, 6 Drawing Sheets

METHOD OF FORMING A HEADLINER THAT INCLUDES SHAPED REINFORCEMENT BRACKETS

TECHNICAL FIELD

The present specification generally relates to reinforcement brackets for a headliner, and more specifically, shaped reinforcement brackets for a headliner formed from a headliner cutout portion.

BACKGROUND

A headliner is a material that covers a roof of a vehicle. Headliners may be formed of layers of material and may include a fabric on an interior facing side to provide a soft touch. Headliners may have a number of functions such as sound reduction and stiffness. When forming the headliners portions may be removed and may be considered scrap or used in their flat, laid-out shape.

Accordingly, a need exists for shaped reinforcement brackets for headliners that are formed from a headliner cutout portion. The reinforcement brackets can be shaped and then applied to the headliners at the desired locations.

SUMMARY

In one embodiment, a method of forming a headliner for a vehicle includes forming the headliner into a desired shape from one or more materials. The headliner includes a a headliner cutout portion corresponding to an opening through the headliner. A reinforcement bracket preform is formed into the headliner cutout portion during the step of forming the headliner. The headliner cutout portion is removed from the headliner. The reinforcement bracket preform is removed from the headliner cutout portion and a shaped reinforcement bracket is formed.

In another embodiment, a vehicle includes an exterior roof panel that extends between sides of the vehicle and between a front windshield and a rear window. A headliner is interior to the exterior roof panel. A shaped reinforcement bracket is assembled to the headliner. The shaped reinforcement bracket is formed of material forming the headliner.

In another embodiment, a combination headliner and shaped reinforcement bracket is packaged with the headliner. The combination headliner and shaped reinforcement bracket includes the headliner that is configured to be assembled within a vehicle at a location interior to an exterior roof panel. A shaped reinforcement bracket is configured to be assembled to the headliner. The shaped reinforcement bracket is formed of material forming the headliner.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Vehicles according to the present specification include shaped reinforcement brackets that are formed out of headliner material. The headliner material is formed from a headliner cutout portion. For example, the headliner cutout portion may be located where a sunroof will be located. As used herein, the term "sunroof" refers to any panel on the roof of a car that permits light, air or both to come into a vehicle and includes moon roofs. The bracket shape is generally cut from the headliner cutout portion. While the headliner cutout portion may be located where the sunroof will be located, the headliner cutout portion may be located anywhere on the headliner where an opening including a notch is desired. The bracket shape may be formed into the cutout portion of the headliner, e.g., using a mold and heat, into a final three-dimensional reinforcement bracket shape. The shaped reinforcement brackets can then be installed on the headliner to provided added reinforcement.

Figure 1:
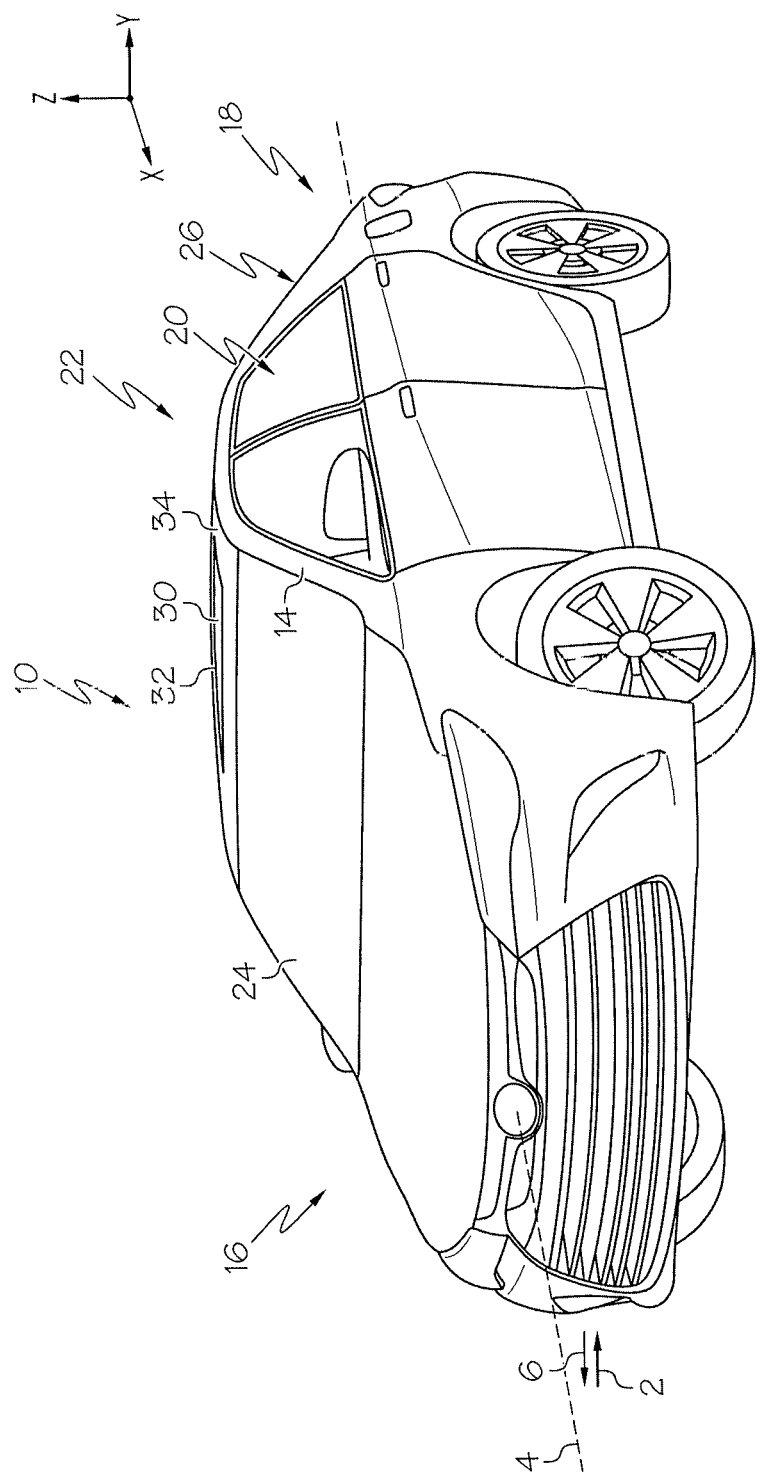
FIG. 1 illustrates a perspective view of a vehicle, according to one or more embodiments shown and described herein.

As used herein, the term "vehicle longitudinal direction" refers to the forward-rearward direction of the vehicle (i.e., in the +/− vehicle X-direction depicted in FIG. 1). The term "vehicle lateral direction" refers to the cross-vehicle direction (i.e., in the +/− vehicle Y-direction depicted in FIG. 1), and is transverse to the vehicle longitudinal direction. The term "vehicle vertical direction" refers to the upward-downward direction of the vehicle (i.e., in the +/− vehicle Z-direction depicted in FIG. 1). Further, the terms "inboard," "inward," "outboard" and "outward" are used to describe the relative positioning of various components of the vehicle. Referring to FIG. 1, the terms "outboard" or "outward" as used herein refers to the relative location of a component in direction 2 with respect to a vehicle centerline 4. The term "inboard" or "inward" as used herein refers to the relative location of a component in direction 6 with respect to the vehicle centerline 4. Because the vehicle structures may be generally symmetrical about the vehicle centerline 4, the direction to which use of terms "inboard," "inward," "outboard" and "outward" refer may be mirrored about the vehicle centerline 4 when evaluating components positioned along opposite sides of the vehicle 10.

The vehicle 10 may include a body framework 14 and have a front 16, a rear 18 and sides 20 that extend between the front 16 and the rear 18. A roof assembly 22 of the vehicle 10 extends between the sides 20 and between a front windshield 24 and a rear window 26. The roof assembly 22 may include a sunroof 30 that includes an outer sunroof panel 32 that is mounted in a same plane as an exterior panel 34 of the roof assembly 22.

Figure 2:
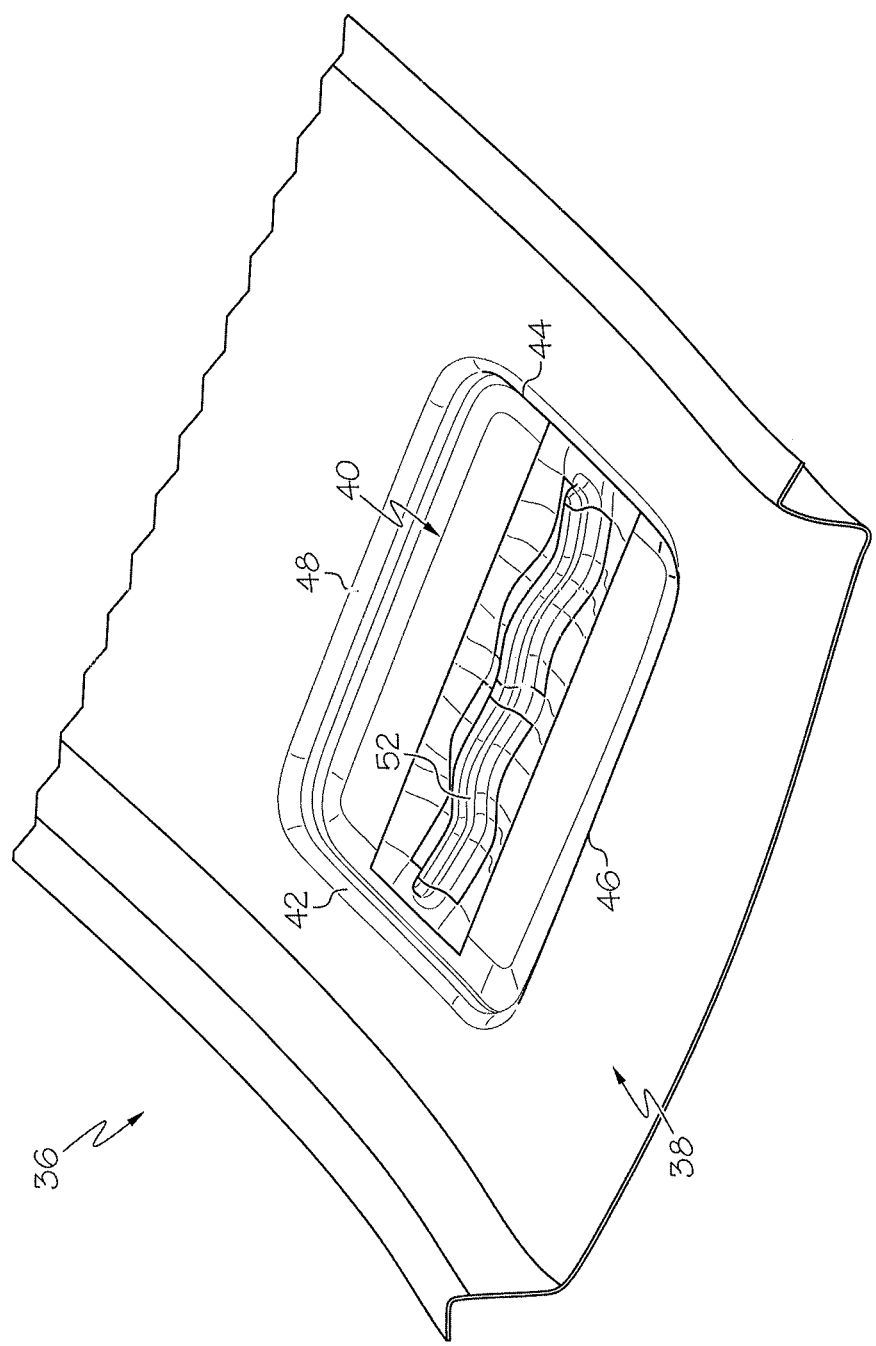
FIG. 2 illustrates a perspective view of a headliner with a headliner cutout portion, according to one or more embodiments shown and described herein.

A headliner is located interior to the exterior panel 34. Referring to FIG. 2, a portion of the headliner 36 is illustrated in an unassembled configuration. The headliner 36 includes a front portion 38 with a headliner cutout portion 40 located in a middle of the front portion 38. The headliner cutout portion 40 is formed between side walls 42 and 44 and front and back walls 46 and 48 of a sunroof portion of the headliner 36.

Figure 4:
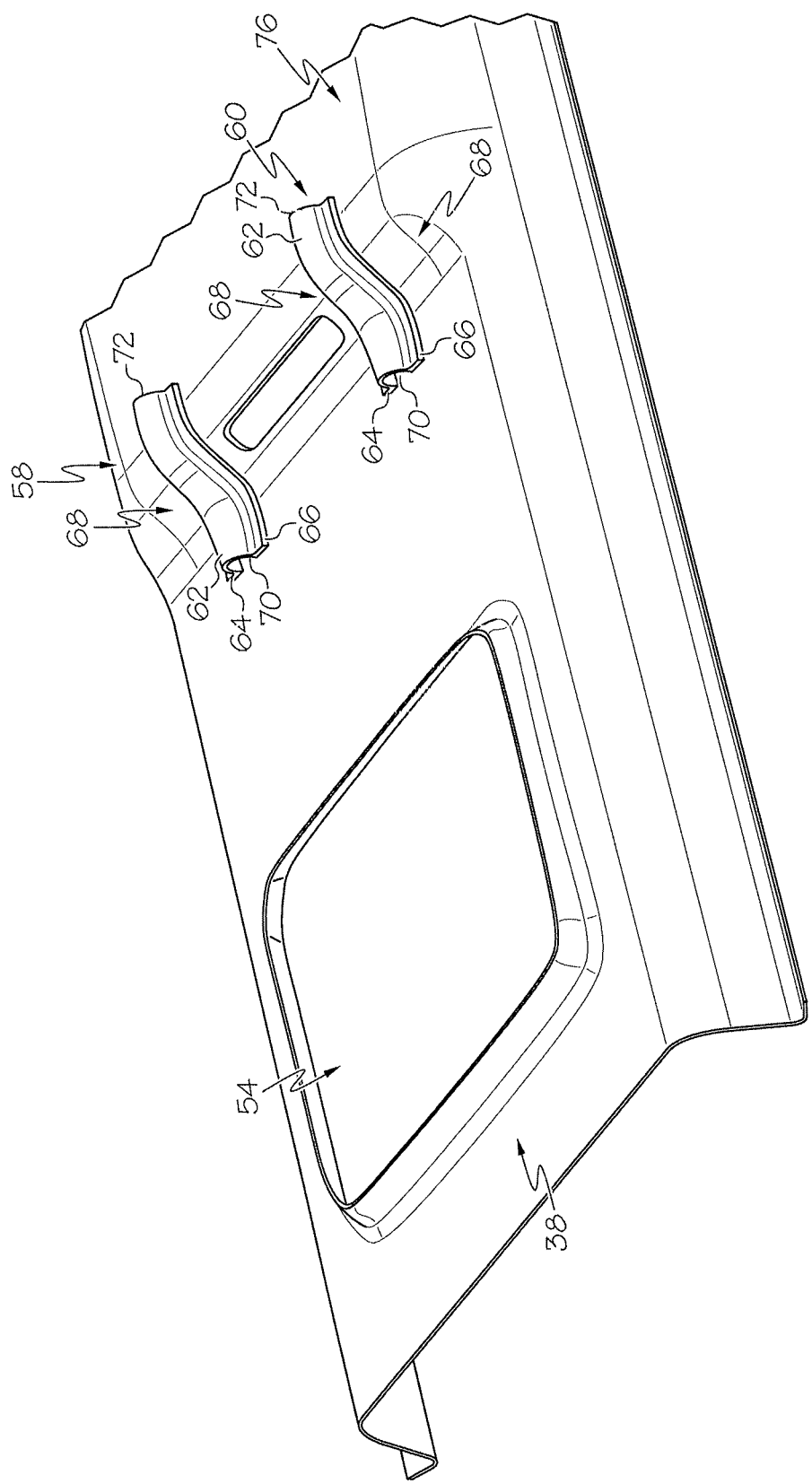
FIG. 4 illustrates a perspective view of the headliner of FIG. 3 with shaped reinforcement brackets formed out of material forming the headliner, according to one or more embodiments shown and described herein.

A reinforcement bracket preform, represented by element 52, may be formed directly into the headliner cutout portion 40. As one example, the reinforcement bracket preform 52 may be formed into the headliner cutout portion 40 during formation of the headliner 36. In some embodiments, some of the reinforcement bracket preform 52 may be formed after the headliner 36 is formed. The headliner cutout portion 40 may then be removed from the headliner 36 leaving an opening 54 (FIG. 4). The reinforcement bracket preform 52 may then be removed from the headliner cutout portion 40 (e.g., by cutting, stamping, etc.).

Figure 3:
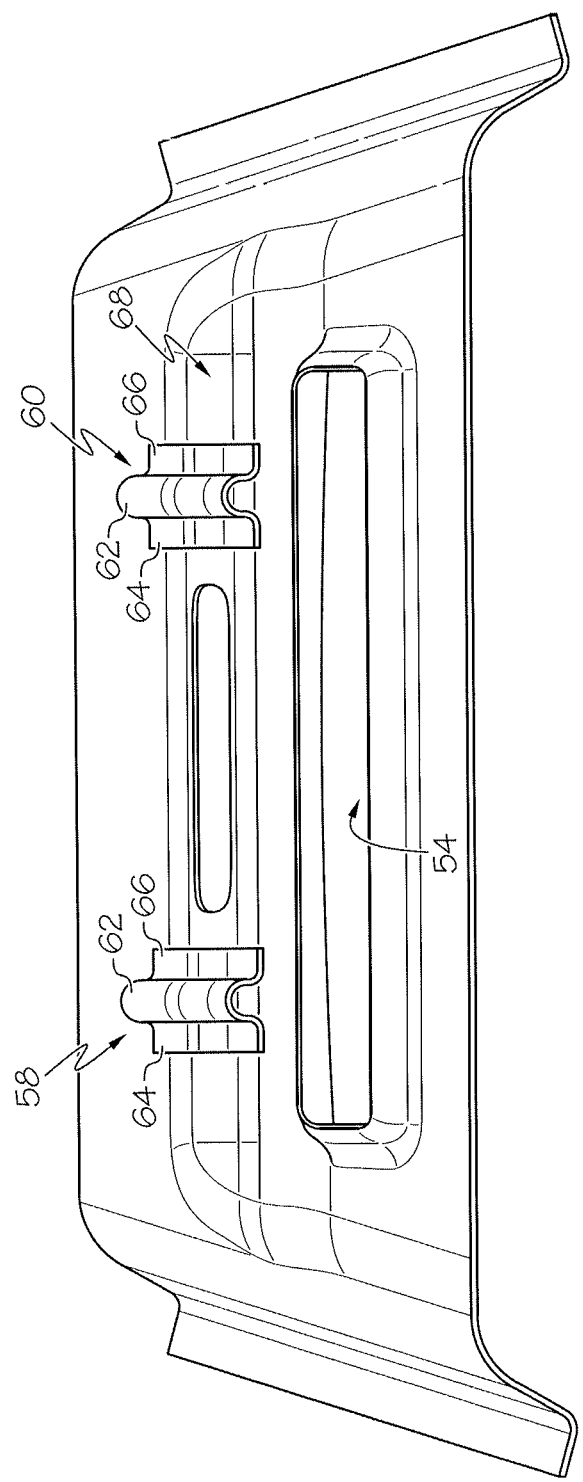
FIG. 3 illustrates a perspective view of a headliner with shaped reinforcement brackets formed out of material forming the headliner, according to one or more embodiments shown and described herein.
Figure 5:
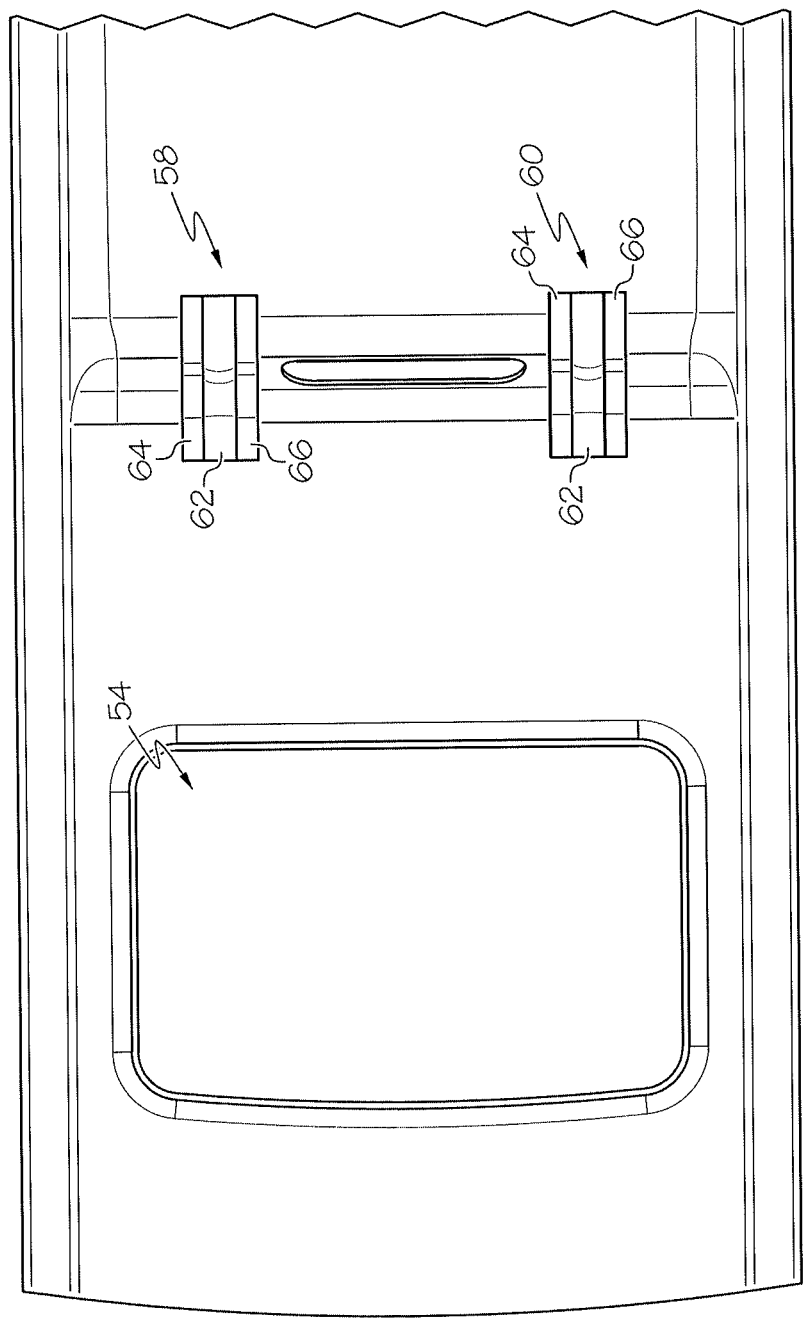
FIG. 5 illustrates a perspective view of the headliner of FIG. 3 with shaped reinforcement brackets formed out of material forming the headliner, according to one or more embodiments shown and described herein.

Referring to FIGS. 3-5, shaped reinforcement brackets 58 and 60 may be formed from the reinforcement bracket preform 52. In some embodiments, the reinforcement bracket preform 52 may be the final reinforcement bracket shape. The shaped reinforcement brackets 58 are generally U-shaped and include a curved central portion 62 and flanges 64 and 66 that extend outwardly from the curved central portion 62 in the vehicle lateral direction. The shaped reinforcement brackets 58 and 60 extend along a transition portion 68 of the headliner 36 where the headliner 36 transitions from one elevation to another.

Referring to FIG. 4, the shaped reinforcement brackets 58 and 60 themselves have a transition portion 68 between a front end 70 and a rear end 72. The transition portion 68 can have a contour that matches the contour of the transition portion 68 of the headliner 36. The shaped reinforcement brackets 58 and 60 have the front end 70 that is located on front portion 38 of the headliner 36 and the rear end 72 that is located on rear portion 76 of the headliner 36. The shaped reinforcement brackets 58 and 60 may extend beyond the transition portion 68 in the vehicle longitudinal direction both forwardly and rearwardly. While the shaped reinforcement brackets 58 and 60 are located at the transition portion 68, they may be located at other positions on the headliner 36 depending on where reinforcement may be needed.

The shaped reinforcement brackets 58 and 60 are both formed of the same material as the rest of the headliner 36. The shaped reinforcement brackets 58 and 60 may be connected to the headliner 36 by any suitable method such as adhesives and/or fasteners.

Figure 6:
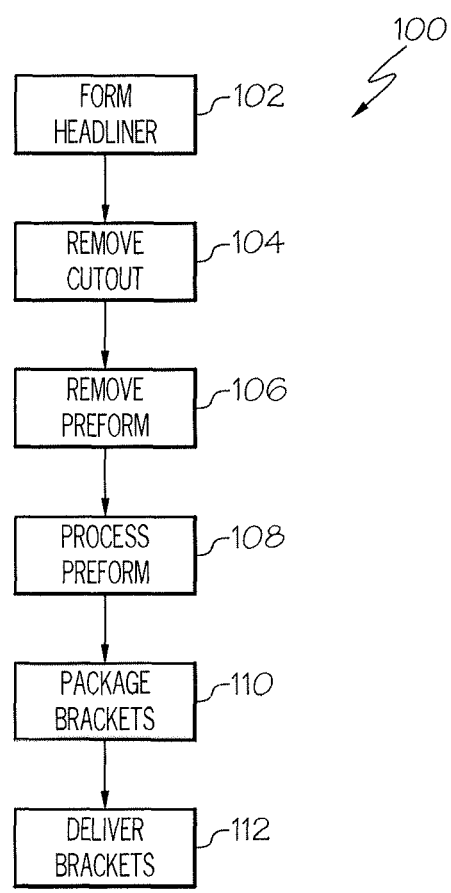
FIG. 6 illustrates a method of forming a headliner with shaped reinforcement brackets, according to one or more embodiments shown and described herein.

Referring to FIG. 6, a method 100 of forming the headliner 36 is illustrated. At step 102, the headliner 36 is formed from one or more materials according to desired specifications. In some embodiments, an inner surface of the headliner 36 may be formed using a fabric material, while other layers may be formed of one or more different materials thereby forming a composite material. The headliner 36 may be formed to a particular shape and includes the headliner cutout portion 40 located in the middle of front portion 38. In some embodiments, step 102 includes forming the reinforcement bracket preform 52 directly into the headliner cutout portion 40. In some embodiments, the reinforcement bracket preform 52 or portions thereof may be formed in another step. At step 104, the headliner cutout portion 40 may be removed from the headliner 36 (e.g., by cutting, stamping, etc.) leaving an opening 54. At step 106, the reinforcement bracket preform 52 may then be removed from the headliner cutout portion 40. In some embodiments, the reinforcement bracket preform 52 may be removed from the headliner cutout portion 40 before removing the headliner cutout portion 40 from the headliner 36. At step 108, the reinforcement bracket preform 52 may be further processed into the final shaped reinforcement brackets 58 and 60. In some embodiments, the reinforcement bracket preform 52 may be removed from the headliner cutout portion 40 without any need for further processing to achieve the desired shape.

At step 110, the shaped reinforcement brackets 58 and 60 may be packaged together with the headliner 36. The shaped reinforcement brackets 58 and 60 may be delivered with the headliner 36 to an assembly location that is remote (i.e., removed) from the location where the headliner is manufactured at step 112. The shaped reinforcement brackets 58 and 60 may be delivered with the headliner 36 without assembling the shaped reinforcement brackets 58 and 60 to the headliner 36 (as shown in FIGS. 3-5).

The above described methods provide shaped reinforcement brackets that are formed out of material forming the headliner cutting down on waste. The reinforcement brackets are shaped and non-planar to improve their support of predetermined portions of the headliner upon headliner assembly within a vehicle. As one example, the shaped reinforcement brackets may be assembled to the headliner at transition locations where the headliner changes elevation. The shaped reinforcement brackets may be shipped unassembled with the headliner in order to reduce impact on shipping footprint. Once at an assembly location, the shaped reinforcement brackets may be assembled to the headliner at the preselected locations.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A method of forming a headliner for a vehicle, the method comprising:
    forming the headliner into a desired shape from one or more materials, the headliner comprising a headliner cutout portion corresponding an opening through the headliner;
    forming a reinforcement bracket preform directly out of the headliner cutout portion during the step of forming the headliner into the desired shape, the reinforcement bracket preform is formed from material forming the headliner cutout and extends out of a plane defined by the headliner cutout portion;
    removing the headliner cutout portion from the headliner; and removing the reinforcement bracket preform from the headliner cutout portion and forming a shaped reinforcement bracket, the shaped reinforcement bracket having a different shape than the reinforcement bracket preform after the reinforcement bracket preform is removed from the headliner cutout portion and is formed.

2. The method of claim 1 further comprising delivering the headliner with the shaped reinforcement bracket to an assembly location.

3. The method of claim 2, wherein the headliner and the shaped reinforcement bracket are delivered unassembled.

4. The method of claim 1 comprising forming multiple shaped reinforcement brackets from the reinforcement bracket preform and assembling the multiple shaped reinforcement brackets to the headliner.

5. The method of claim 1, wherein the shaped reinforcement bracket comprises a U-shaped central portion that extends lengthwise between a front end and a rear end of the shaped reinforcement bracket.

6. The method of claim 5, wherein the shaped reinforcement bracket comprises side flanges that extend outward along opposite sides of the U-shaped central portion.

7. The method of claim 6, wherein the shaped reinforcement bracket comprises a transition portion that changes elevation between the front end and the rear end.

8. The method of claim 1 further comprising assembling the shaped reinforcement bracket to the headliner.

* * * * *